US006987639B1

(12) United States Patent
Yu

(10) Patent No.: US 6,987,639 B1
(45) Date of Patent: Jan. 17, 2006

(54) DISK DRIVE MODIFYING A ROTATIONAL POSITION OPTIMIZATION ALGORITHM BASED ON MOTOR CAPABILITY OF A VCM

(75) Inventor: Jie Yu, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 232 days.

(21) Appl. No.: 10/676,578

(22) Filed: Sep. 30, 2003

(51) Int. Cl.
*G11B 5/55* (2006.01)

(52) U.S. Cl. .............................. 360/78.04; 360/78.09; 710/39; 711/112; 711/167

(58) Field of Classification Search ............ 360/78.04, 360/75, 78.06, 78.09; 710/5–6, 39, 310, 710/74; 711/111–113, 137, 151, 158, 167
See application file for complete search history.

(56) References Cited

U.S. PATENT DOCUMENTS

| | | | | |
|---|---|---|---|---|
| 5,119,250 A | | 6/1992 | Green et al. | |
| 5,220,653 A | | 6/1993 | Miro | |
| 5,729,718 A | | 3/1998 | Au | 711/167 |
| 5,793,558 A | | 8/1998 | Codilian et al. | 360/78.06 |
| 6,115,205 A | | 9/2000 | Waugh et al. | 360/78.06 |
| 6,272,565 B1 | | 8/2001 | Lamberts | 710/43 |
| 6,343,351 B1 | | 1/2002 | Lackman et al. | 711/158 |
| 6,369,972 B1 | | 4/2002 | Codilian et al. | 360/78.04 |
| 6,418,510 B1 | | 7/2002 | Lamberts | 711/113 |
| 6,445,531 B1 | | 9/2002 | Gaertner et al. | 360/78.06 |
| 6,515,819 B1 | * | 2/2003 | Schmidt et al. | 360/78.04 |
| 6,549,211 B1 | | 4/2003 | Ghosh et al. | |
| 6,604,178 B1 | | 8/2003 | Hall | 711/167 |
| 6,744,590 B2 | | 6/2004 | Chu et al. | 360/78.06 |
| 6,754,036 B2 | | 6/2004 | Dehnert | 360/78.07 |
| 6,809,896 B2 | * | 10/2004 | Espeseth et al. | 360/78.07 |
| 6,836,273 B1 | | 12/2004 | Kadono | |
| 2002/0167749 A1 | | 11/2002 | Kulakowski et al. | |
| 2003/0034936 A1 | | 2/2003 | Ernst et al. | |
| 2004/0034724 A1 | | 2/2004 | Bruner et al. | |
| 2004/0088478 A1 | * | 5/2004 | Hall | 711/112 |
| 2004/0255055 A1 | | 12/2004 | Lamberts | 710/5 |
| 2004/0263475 A1 | | 12/2004 | Wecker et al. | |

FOREIGN PATENT DOCUMENTS

JP 2001154809 * 6/2001

OTHER PUBLICATIONS

U.S. Appl. No. 10/060,881 filed Jan. 29, 2002, entitled "Automated Tuning of Disc Drive Seek Profile".

* cited by examiner

*Primary Examiner*—David Hudspeth
*Assistant Examiner*—James L Habermehl
(74) *Attorney, Agent, or Firm*—Howard H. Sheerin, Esq.

(57) ABSTRACT

A disk drive is disclosed comprising a disk, a head, and a voice coil motor (VCM) for actuating the head over the disk. The disk drive executes a rotational position optimization (RPO) algorithm to select a next command to execute relative to an estimated seek time computed for each command in a command queue. A motor capability of the VCM is estimated and used to modify the estimated seek time for each command in the command queue to thereby optimize the RPO algorithm.

26 Claims, 4 Drawing Sheets

DISK DRIVE MODIFYING A ROTATIONAL POSITION OPTIMIZATION ALGORITHM BASED ON MOTOR CAPABILITY OF A VCM

BACKGROUND OF THE INVENTION

1. Field of the Invention

The present invention relates to disk drives. In particular, the present invention relates to a disk drive that modifies a rotational position optimization (RPO) algorithm based on the motor capability of a voice coil motor (VCM).

2. Description of the Prior Art

A disk drive may employ an RPO algorithm in order to execute commands in an order which minimizes the seek latency of the head as well as the rotational latency of the disk. After executing a current command, the RPO algorithm will typically evaluate various parameters to select the next command that minimizes the access time with respect to the radial and circumferential location of the head. The seek latency of the head (the time required to move the head from a current track to a new track) has typically been determined by evaluating a small number of disk drives to establish nominal seek profiles for a family of disk drives. Each individual disk drive is then manufactured with the nominal seek profiles which may lead to sub-optimal performance since the nominal seek profiles are selected to account for worst case conditions. U.S. patent application Ser. No. 10/060,881 Pub. No. U.S. 2002/0131195 discloses a method for calibrating the seek profiles for each individual disk drive in a family of disk drives during manufacturing, as well as updating the seek profiles "in the field" to account for changes in the disk drive that occur over time.

The method disclosed in the '881 patent application includes a manufacturing process for each individual disk drive wherein the seek time of the head to travel a distance D is measured over multiple seeks and statistically averaged to establish an initial seek profile. A problem with this technique, however, is it increases the manufacturing time significantly due to the multiple seeks performed for each seek distance D, as well as the numerous seek distances that must be calibrated. While in the field, the '881 patent application updates the seek profiles for each individual disk drive by statistically averaging the actual seek times with the current seek profiles. A problem with this technique, however, is the statistical averaging algorithm must have a very slow response in order to filter noise. This means the seek profiles will be updated slowly in response to changes in the disk drive leading to sub-optimal tracking of faster deviations.

There is, therefore, a need to customize the RPO algorithm for each individual disk drive without significantly increasing the manufacturing time. There is also a need to modify the RPO algorithm to quickly track changes in the operating characteristics of each individual disk drive while in the field.

SUMMARY OF THE INVENTION

The present invention may be regarded as a disk drive comprising a disk having a plurality of tracks, a head, a voice coil motor (VCM) for actuating the head over the disk, a command queue for storing a plurality of disk access commands, and a disk controller. The disk controller executes a rotational position optimization (RPO) algorithm to select a disk access command from the command queue as the next command to execute relative to an estimated seek time required to seek the head to a target track for each command in the command queue. The disk controller estimates a motor capability of the VCM by measuring a velocity of the VCM relative to a current flowing through the VCM, and modifies the estimated seek time for each command in the command queue in response to the estimated motor capability. The disk controller then executes the RPO algorithm using the modified estimated seek times.

In one embodiment, the disk controller determines the estimated motor capability of the VCM during an acceleration phase or a deceleration phase. In one embodiment, the disk controller computes a ratio of a difference in an estimated velocity of the VCM to a difference in an expected velocity of the VCM over a predetermined time interval of the acceleration phase. In one embodiment, the difference in the expected velocity of the VCM is determined by integrating a current flowing through the VCM. In one embodiment, the disk drive comprises a current detector for detecting the current flowing through the VCM, and in an alternative embodiment, the current flowing through the VCM is estimated.

In one embodiment, the disk controller determines the estimated motor capability of the VCM by applying an acceleration current to the VCM during the acceleration phase, wherein the acceleration current is significantly less than a saturation current. The estimated motor capability is then measured relative to the distance the VCM travels over a predetermined time interval.

In another embodiment, the disk controller decreases the estimated seek time for each command in the command queue if the estimated motor capability increases, and the disk controller increases the estimated seek time for each command in the command queue if the estimated motor capability decreases.

In still another embodiment, the disk controller modifies the estimated seek time for each command in the command queue in response to the estimated motor capability and a seek distance for each command in the command queue. In one embodiment, the disk controller modifies the estimated seek time for each command in the command queue by computing a seek time delta in response to the estimated motor capability and the seek distance and adding the seek time delta to a nominal estimated seek time.

The present invention may also be regarded as a method of executing a rotational position optimization (RPO) algorithm in a disk drive for selecting a disk access command from a command queue as the next command to execute relative to an estimated seek time required to seek a head to a target track of a disk for each command in the command queue. A voice coil motor (VCM) within the disk drive actuates the head over the disk. A motor capability of the VCM is estimated by measuring a velocity of the VCM relative to a current flowing through the VCM. The estimated seek time for each command in the command queue is modified in response to the estimated motor capability, and the RPO algorithm is executed using the modified estimated seek times

DESCRIPTION OF THE PREFERRED EMBODIMENTS

Figures 1A, 1B:
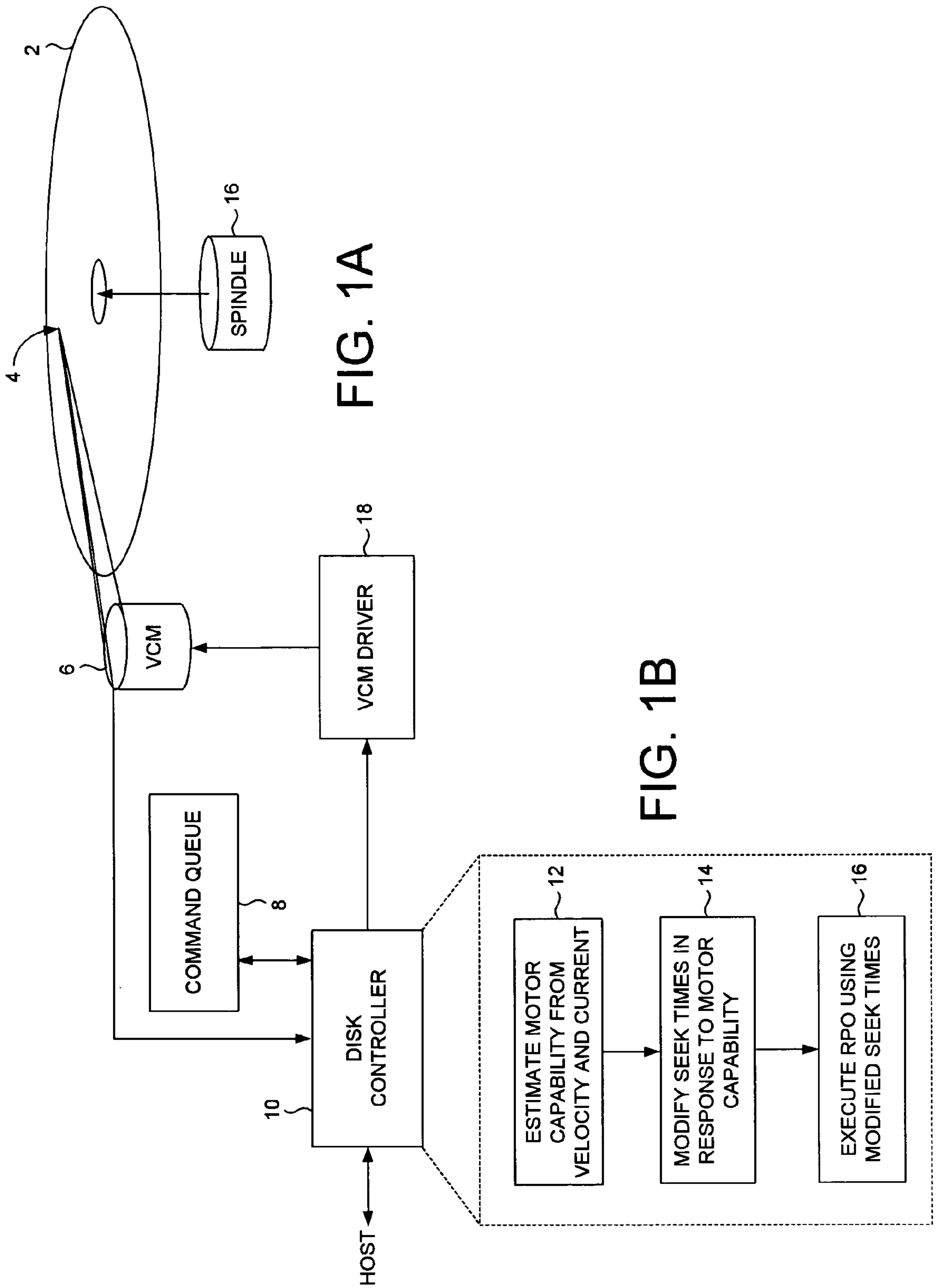
FIG. 1A shows a disk drive according to an embodiment of the present invention including a command queue for staging read/write commands received from a host computer, and a disk controller for selecting the next command to execute from the command queue according to an RPO algorithm.
FIG. 1B is a flow chart executed by the disk controller according to an embodiment of the present invention wherein the estimated motor capability of the VCM is measured and used to modify the estimated seek times for the commands in the command queue in order to optimize the RPO algorithm.

FIG. 1A shows a disk drive according to an embodiment of the present invention comprising a disk 2 having a plurality of tracks, a head 4, a voice coil motor (VCM) 6 for actuating the head 4 over the disk 2, a command queue 8 for storing a plurality of disk access commands, and a disk controller 10. The disk controller 10 executes a rotational position optimization (RPO) algorithm to select a disk access command from the command queue 8 as the next command to execute relative to an estimated seek time required to seek the head 4 to a target track for each command in the command queue 8. As shown in the flow diagram of FIG. 1B, at step 12 the disk controller 10 estimates a motor capability of the VCM 6 by measuring a velocity of the VCM 6 relative to a current flowing through the VCM 6, and at step 14 modifies the estimated seek time for each command in the command queue 8 in response to the estimated motor capability. At step 16 the disk controller 10 then executes the RPO algorithm using the modified estimated seek times.

The disk 2 in FIG. 1A comprises a plurality of concentric, radially spaced tracks having embedded servo sectors recorded in servo wedges for use in positioning the head 4 over a target track. A spindle motor 16 rotates the disk 2 about a center axis while the head 4 accesses the target track during read and write operations. A VCM driver 18 controls the current applied to the VCM 6, and in one embodiment, the VCM driver 18 comprises a plurality of field effect transistors (FETs) configured into a conventional H-bridge circuit. The FETs are pulse width modulated (PWM) to control the amount of current flowing through the voice coil of the VCM 6, wherein a control signal supplied by the disk controller 10 configures a duty cycle of the PWM.

In one embodiment, the disk controller 10 comprises a read channel for demodulating the read signal emanating from the head 4 during read operations, and a servo controller for generating control signals applied to the VCM driver 18. The read channel and servo controller may be implemented as separate integrated circuits, or they may be combined with other disk controller circuitry into a "system on a chip". In one embodiment, the disk controller 10 comprises a microprocessor for performing some or all of the read channel and/or servo control operations.

Figure 2:
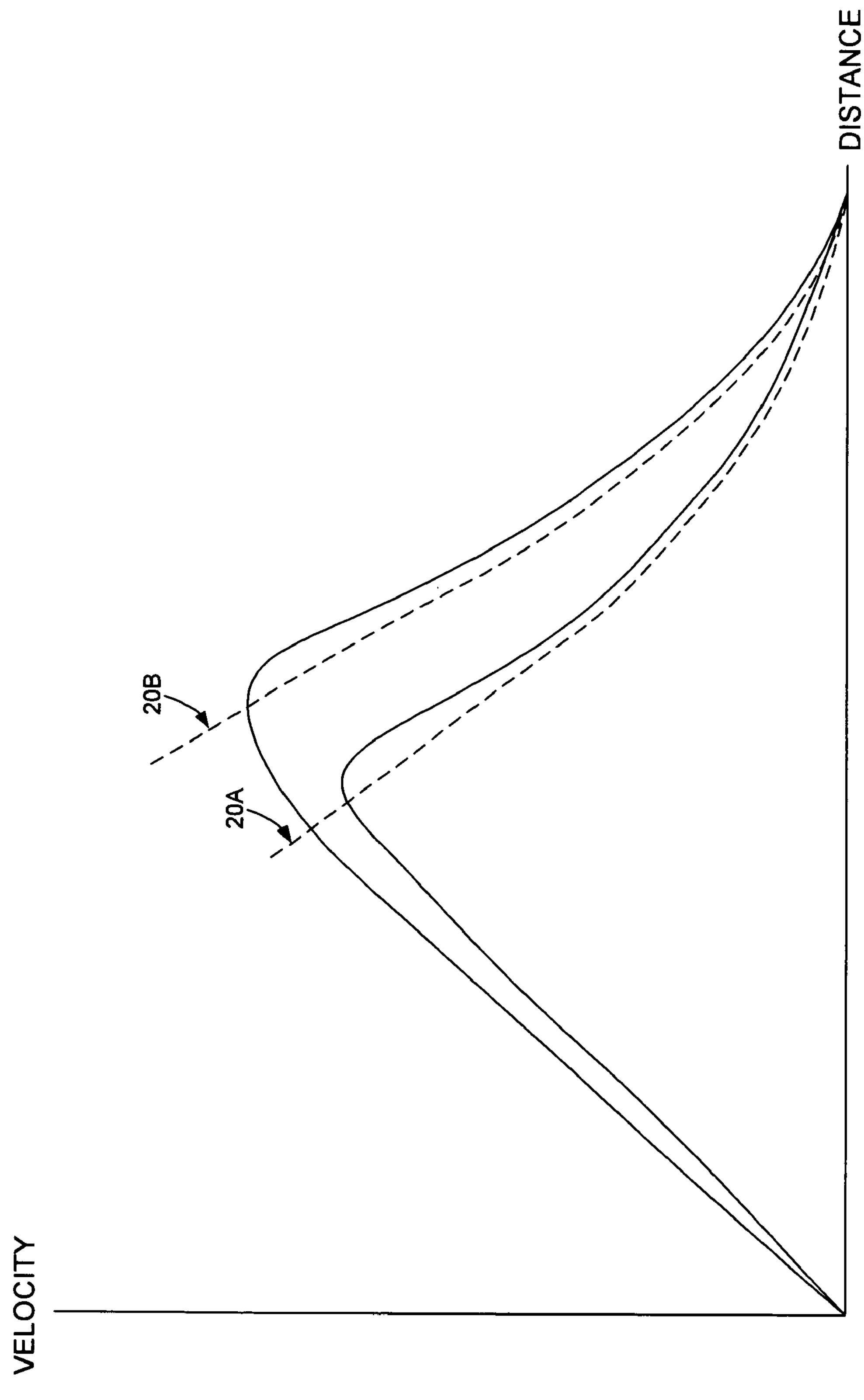
FIG. 2 illustrates two different deceleration profiles corresponding to two different motor capability values for the VCM.

During a seek operation the VCM driver 18 is controlled to accelerate/decelerate the head 4 toward a target track. During acceleration, a maximum possible forward current is applied to the VCM 6 so that the VCM 6 accelerates as fast as possible, and during deceleration the velocity of the VCM 6 is controlled to track a predetermined deceleration profile until the head reaches the target track. The slope of the deceleration profile determines the maximum seek time. A steep deceleration profile means the VCM 6 will accelerate longer and then decelerate faster leading to a shorter seek time. However, the VCM 6 will be able to track a steep deceleration profile only if there is sufficient motor capability which is a function of various operating conditions, such as the motor torque constant Kt, the motor resistance, and the supply voltage. These operating conditions can vary between disk drives, as well as with environmental conditions such as the ambient temperature. Therefore the motor capability is estimated and then an optimal deceleration profile is selected for each seek. This is illustrated in FIG. 2 which shows two velocity profiles during a seek of the VCM 6 wherein one of two deceleration profiles 20A and 20B is selected corresponding to two motor capability values. If the first deceleration profile 20A is selected due to a decrease in motor capability, the VCM 6 does not accelerate as long, has a lower maximum velocity, and decelerates over a longer distance. Therefore the seek time associated with deceleration profile 20A will be longer than the seek time associated with deceleration profile 20B.

In one embodiment, the estimated motor capability of the VCM 6 is determined during an acceleration phase or deceleration phase of the VCM 6 (since the deceleration strength is related to the acceleration strength). Any suitable technique may be employed for estimating the motor capability of the VCM 6, including the techniques disclosed in U.S. Pat. No. 5,793,558 and U.S. Pat. No. 5,119,250, the disclosures of which are incorporated herein by reference.

In one embodiment, the motor capability is estimated by commanding the VCM 6 with an acceleration current during the acceleration phase and measuring a velocity of the VCM 6 relative to a current flowing through the VCM 6. In one embodiment, the motor capability is estimated by measuring a ratio of a difference in estimated velocity to a difference in an expected velocity over a predetermined time interval. The difference in the estimated velocity is determined from the track crossing information detected in the embedded servo sectors, and the difference in the expected velocity is determined by integrating the current flowing through the VCM 6. In one embodiment, the actual current flowing through the VCM 6 is measured using a current detector (e.g., a resistor in series with the voice coil), and in another embodiment, the current flowing through the VCM 6 is estimated by applying a near-saturated current to the VCM 6. In this manner the current flowing through the VCM 6 is estimated as the commanded current. The near-saturated current is determined relative to nominal VCM parameters taking into account various factors such as the power supply voltage and the back EMF voltage that builds across the voice coil as the VCM 6 accelerates. In one embodiment, the estimated motor capability is computed according to the following equation:

$$\frac{V(k)-V(k_0)}{\sum_{i=k_0}^{k-1} U(i)+0.5[U(k_0-1)-U(k-1)]}$$

where:

$V(k_0)$ is the estimated velocity of the VCM 6 at the beginning of the predetermined time interval;

V(k) is the estimated velocity of the VCM 6 at the end of the predetermined time interval;

ΣU(i) is the commanded current integrated over the predetermined time interval; and 0.5[U(k0−1)−U(k−1)] is a term that compensates for the delay between the commanded current and actual current flowing through the VCM 6.

The motor capability may be estimated during a calibration mode, or during the acceleration phase of actual seeks during normal operation. In either case, evaluating the velocity and current during the acceleration phase of the VCM 6 provides a fast and accurate estimate of the motor capability used to adjust the estimated seek times for each individual disk drive as compared to measuring the actual seek time over multiple seeks for numerous seek distances.

In one embodiment, the disk controller estimates the motor capability of the VCM by applying an acceleration current to the VCM during the acceleration phase, wherein the acceleration current is significantly less than the saturation current. The motor capability is then estimated as the distance d the VCM travels over a predetermined time interval t (i.e., $d=at^2$ and $a=2d/t^2$ where Kt is proportional to a/I and I is the acceleration current applied to the VCM). This embodiment may be used to establish an initial motor capability, such as during manufacturing of the disk drive, wherein the initial motor capability may then be updated while in the field using an over-saturated or near-saturated acceleration current.

Figure 3:
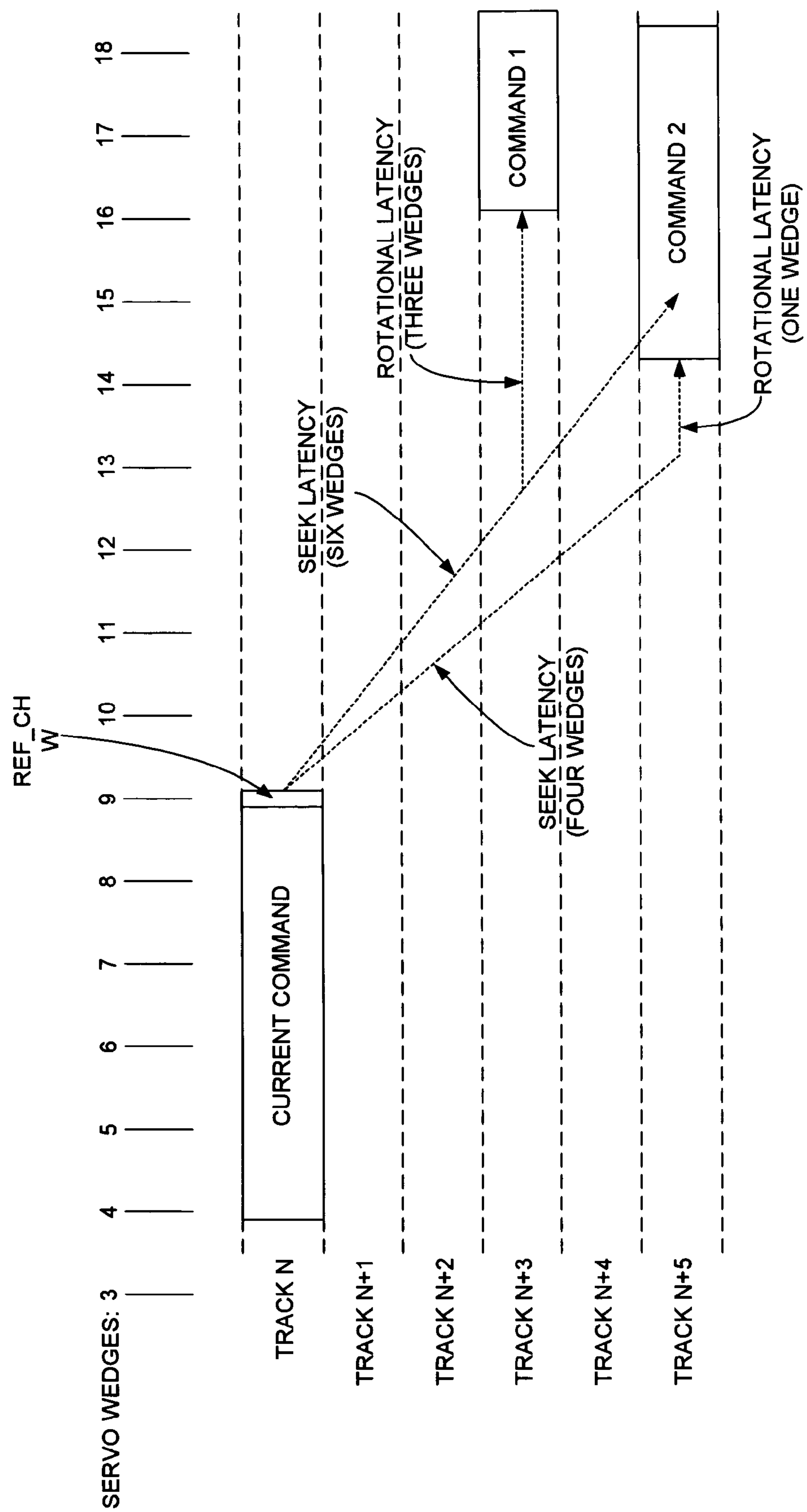
FIG. 3 illustrates how modifying the estimated seek times for each command in the command queue relative to the estimated motor capability optimizes the RPO algorithm.

Once the motor capability has been estimated, it can be used to modify the RPO algorithm for selecting the next command to execute from the command queue 8. This is illustrated in FIG. 3 which shows a current command being executed and two pending commands COMMAND 1 and COMMAND 2. The RPO algorithm computes an access time for the pending commands in the command queue 8 and selects the command that minimizes the access time in terms of seek latency and rotational latency. The seek latency is determined by the deceleration profile selected which is determined from the motor capability. For example, if the motor capability decreases it will take six servo wedges of latency to seek the head 4 from the end of the current command (identified by a reference cylinder/head/wedge or REF_CHW) to the target track comprising COMMAND 2. However, six servo wedges of latency means that the beginning of COMMAND 2 will be missed requiring a revolution to reposition the head 4 to the beginning of COMMAND 2. Therefore the RPO algorithm will select COMMAND 1 as the next command to execute which requires four servo wedges of seek latency and three servo wedges of rotational latency. If the motor capability increases (e.g., due to a temperature change), a more aggressive deceleration profile will be selected so that only four servo wedges of latency are required to seek the head 4 from the end of the current command to the target track comprising COMMAND 2. Therefore the RPO algorithm selects COMMAND 2 as the next command to execute rather than COMMAND 1. From this example it can be seen that the disk controller 10 decreases the estimated seek time for each command in the command queue 8 if the estimated motor capability increases, and the disk controller 10 increases the estimated seek time for each command in the command queue 8 if the estimated motor capability decreases.

Figure 4A:
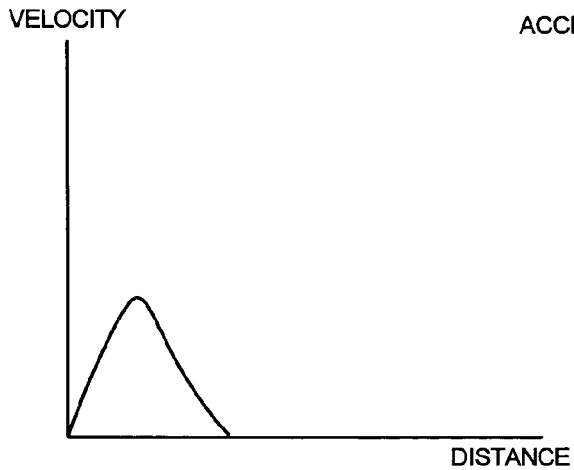
FIGS. 4A and 4B illustrate the velocity and acceleration for short seek distances, wherein changes in the estimated motor capability have essentially no affect on the seek time.
Figure 4B:
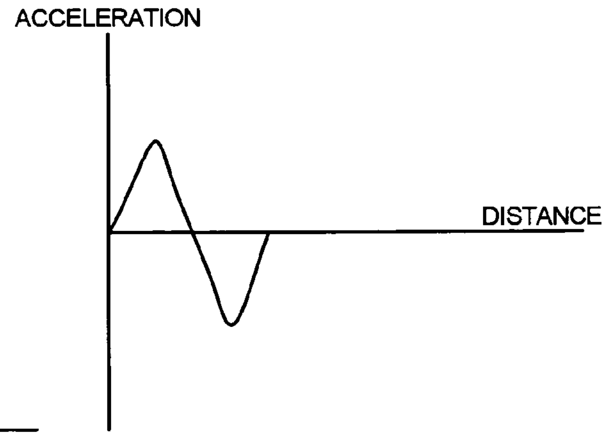
Figure 5A:
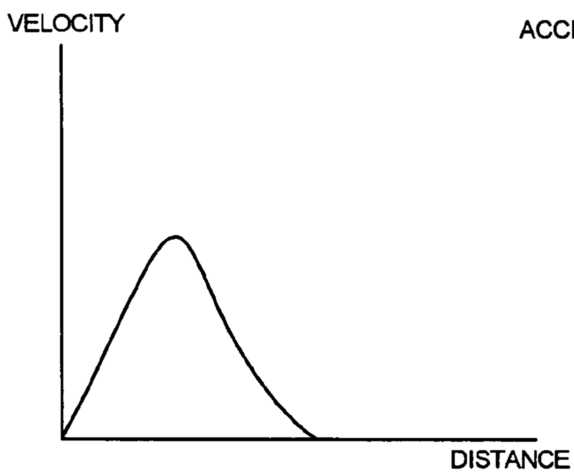
FIGS. 5A and 5B illustrate the velocity and acceleration for longer seek distances, wherein changes in the estimated motor capability have a significant affect on the seek time.
Figure 5B:
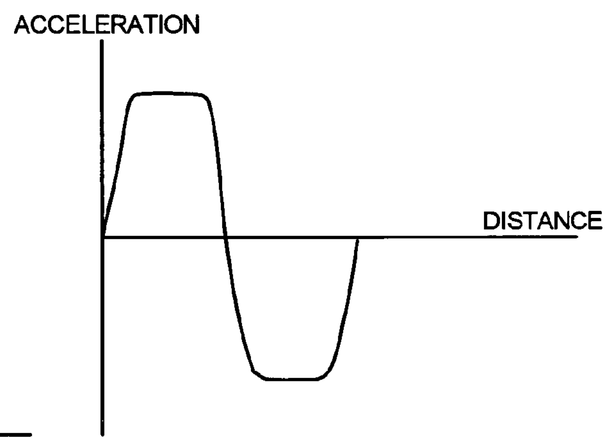
Figure 6A:
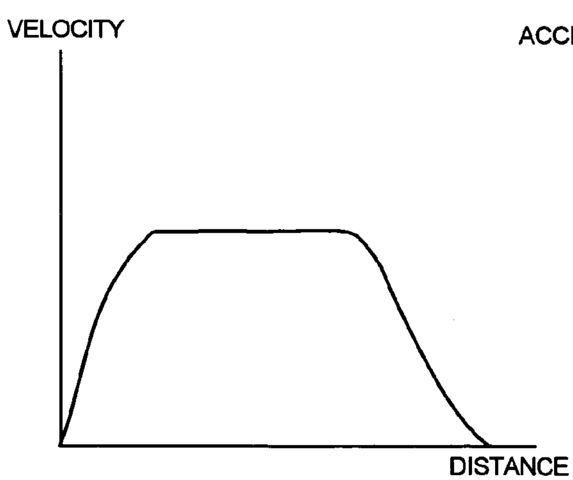
FIGS. 6A and 6B illustrate the velocity and acceleration for very long seek distances, wherein changes in the estimated motor capability affect the seek time only during the acceleration and deceleration phases.
Figure 6B:
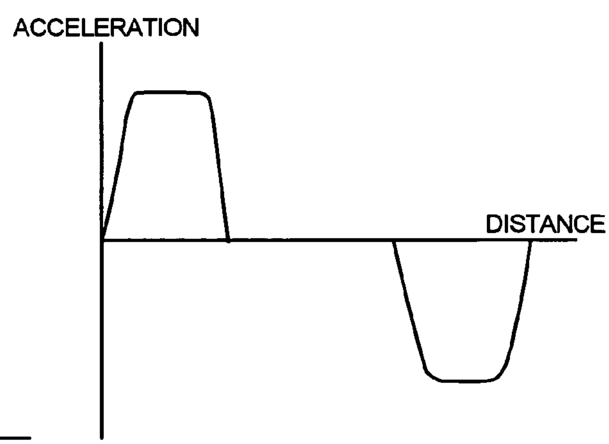

The impact of motor capability on seek time varies with the seek distance. For very short seek distances shown in FIG. 4A, the full motor capability is not needed (acceleration/deceleration does not reach its peak value as shown in FIG. 4B) therefore the seek time is not affected. For longer seek distances shown in FIG. 5A that require full motor capability (acceleration/deceleration reaches peak value as shown in FIG. 5B), the seek time will change inversely with the motor capability. For even longer seek distances shown in FIG. 6A, the VCM 6 may reach a maximum allowed velocity during which the seek time is not affected by the motor capability (acceleration/deceleration is zero as shown in FIG. 6B). That is, the slope of the deceleration profile will have less affect on the seek time if the VCM 6 travels in a constant, maximum velocity over a significant part of the seek. Therefore, in one embodiment the disk controller 10 adjusts the estimated seek time for each command in the command queue 8 in response to the estimated motor capability and a seek distance for each command in the command queue. As the seek distance changes, the estimated seek times are modified (increased or decreased) accordingly in response to the estimated motor capability.

In one embodiment, a seek time sensitivity with respect to the estimated motor capability is computed for a particular seek distance L by taking the derivative of seek time st with respect to the estimated motor capability a, or D(st)/D(a). The estimated seek time est_st is then computed in real time based on the estimated motor capability according to:

$$est\_st=est\_st_0+k*D(st(L))/D(a)*da,\ da=a-a_0$$

where:

st(L) is the seek time as a function of seek distance L;

$est\_st_0$ is a nominal estimated seek time, which in one embodiment is determined statistically over a subset of disk drives or by actual measurement during manufacturing;

a is the estimated motor capability;

$a_0$ is a nominal motor capability;

da is the change in motor capability $(a-a_0)$; and k is a discounting scalar between 0 and 1 which prevents over compensation due to inadequacy of the linear sensitivity model.

In one embodiment, the seek time equation st(L) is based on a simplified seek time model using bang-bang seek profile which is a good estimate for long seek lengths that use full motor capability. In this case the seek time can be computed according to equations $d=a*t^2$ during the acceleration and deceleration part of the seek (where a is acceleration/deceleration), and d= constV*t during a constant velocity part of the seek (where constV is the constant velocity). Rearranging the equations to compute the seek time during acceleration and deceleration:

$$st_{acc}=(2d_{acc}/a)^{1/2} \text{ and } st_{dec}=(2d_{dec}/a)^{1/2}$$

and rearranging the equations to compute the seek time during constant velocity:

$$st^{constV}=(L-(d_{acc}+d_{dec}))/constV$$

where L is the total seek distance and the total seek time st is the summation of $st_{acc}$, $st_{dec}$, and $st_{constV}$. The acceleration variable a is proportional to the motor capability estimated by the disk controller 10.

Let Lamin be the minimum seek distance that uses full motor capability, and let Lvmin be the minimum seek distance that reaches the maximum allowed constant velocity. For seek distances Lamin<L<Lvmin the seek time st can be computed according to the above equations as:

$$st=2*(L/a)^{1/2}$$

For seek distances L>=Lvmin the seek time st can be computed according to the above equations as:

$$st=2*(Lvmin/a)^{1/2}+(L-Lvmin)/constV$$

The sensitivity D(st)/D(a) is then computed for seek distances Lamin<L<Lvmin:

$$D(st)/D(a)=2*(-0.5*L^{1/2}*a^{-3/2})=-0.5*(2*(L/a)^{1/2}/a)=-0.5*st/a$$

similarly for seek distances L>=Lvmin:

$$D(st)/D(a)=-0.5*(st(Lvmin))/a$$

and for seek distances L<Lmin:

$$D(st)/D(a)=0$$

In an alternative embodiment, the seek time sensitivity D(st)/D(a) is measured under nominal operation conditions by measuring the seek time for multiple seek distances over the entire seek range. The motor capability is then adjusted from a nominal value by a predetermined delta and the seek time re-measured. The motor capability adjustment may be performed for a number of different deltas, and the seek time re-measured for each adjustment. The seek time sensitivity (as function of seek distance L) is then computed from the test data. In yet another embodiment, a mathematical model (such as piece-wise polynomial model) is used to approximate the seek time sensitivity which is then implemented in firmware.

I claim:

1. A disk drive comprising:

(a) a disk comprising a plurality of tracks;

(b) a head;

(c) a voice coil motor (VCM) for actuating the head over the disk;

(d) a command queue for storing a plurality of disk access commands; and (e) a disk controller for executing a rotational position optimization (RPO) algorithm to select a disk access command from the command queue as the next command to execute relative to an estimated seek time required to seek the head to a target track for each command in the command queue, wherein:

the disk controller estimates a motor capability of the VCM by measuring a velocity of the VCM relative to a current flowing through the VCM;

the disk controller modifies the estimated seek time for each command in the command queue in response to the estimated motor capability; and the disk controller executes the RPO algorithm using the modified estimated seek times.

2. The disk drive as recited in claim 1, wherein the disk controller determines the estimated motor capability during an acceleration phase of the VCM.

3. The disk drive as recited in claim 2, wherein the disk controller determines the estimated motor capability of the VCM by computing a ratio of a difference in an estimated velocity of the VCM to a difference in an expected velocity of the VCM over a predetermined time interval of the acceleration phase.

4. The disk drive as recited in claim 3, wherein the difference in the expected velocity of the VCM is determined by integrating a current flowing through the VCM.

5. The disk drive as recited in claim 4, further comprising a current detector for detecting the current flowing through the VCM.

6. The disk drive as recited in claim 4, wherein the current flowing through the VCM is estimated by applying a near-saturated acceleration current to the VCM during the acceleration phase.

7. The disk drive as recited in claim 1, wherein the disk controller determines the estimated motor capability during a deceleration phase of the VCM.

8. The disk drive as recited in claim 1, wherein the disk controller determines the estimated motor capability of the VCM by:

(a) applying an acceleration current to the VCM during the acceleration phase, wherein the acceleration current is significantly less than a saturation current; and (b) measuring a distance traveled by the VCM over a predetermined time interval.

9. The disk drive as recited in claim 1, wherein the disk controller decreases the estimated seek time for each command in the command queue if the estimated motor capability increases.

10. The disk drive as recited in claim 1, wherein the disk controller increases the estimated seek time for each command in the command queue if the estimated motor capability decreases.

11. The disk drive as recited in claim 1, wherein the disk controller modifies the estimated seek time for each command in the command queue in response to the estimated motor capability and a seek distance for each command in the command queue.

12. The disk drive as recited in claim 11, wherein the disk controller modifies the estimated seek time for each command in the command queue by:

(a) computing a seek time delta in response to the estimated motor capability and the seek distance; and (b) adding the seek time delta to a nominal estimated seek time.

13. The disk drive as recited in claim 12, wherein the disk controller modifies the estimated seek time for each command in the command queue according to:

$$est\_st=est\_st_0+k*D(st(L))/D(a)*da$$

where:

st(L) is a seek time as a function of the seek distance L;

$est\_st_0$ is the nominal estimated seek time;

a is the estimated motor capability;

$a_0$ is a nominal motor capability;

da is the difference between a and $a_0$; and k is a discounting scalar.

14. A method of executing a rotational position optimization (RPO) algorithm in a disk drive for selecting a disk access command from a command queue as the next command to execute relative to an estimated seek time required to seek a head to a target track of a disk for each command in the command queue, wherein a voice coil motor (VCM) actuates the head over the disk, the method comprising the steps of:

(a) estimating a motor capability of the VCM by measuring a velocity of the VCM relative to a current flowing through the VCM;

(b) modifying the estimated seek time for each command in the command queue in response to the estimated motor capability; and (c) executing the RPO algorithm using the modified estimated seek times.

15. The method as recited in claim 14, wherein the motor capability is estimtaed during an acceleration phase of the VCM.

16. The method as recited in claim 15, wherein the step of estimating the motor capability of the VCM comprises the step of computing a ratio of a difference in an estimated velocity of the VCM to a difference in an expected velocity of the VCM over a predetermined time interval of the acceleration phase.

17. The method as recited in claim 16, wherein the difference in the expected velocity of the VCM is determined by integrating a current flowing through the VCM.

18. The method as recited in claim 17, further comprising the step of detecting the current flowing through the VCM.

19. The method as recited in claim 17, further comprising the step of estimating the current flowing through the VCM by applying a near-saturated acceleration current to the VCM during the acceleration phase.

20. The method as recited in claim 14, wherein the motor capability is estimated during a deceleration phase of the VCM.

21. The method as recited in claim 14, wherein the step of estimating the motor capability of the VCM comprises the steps of:

(a) applying an acceleration current to the VCM during the acceleration phase, wherein the acceleration current is significantly less than a saturation current; and (b) measuring a distance traveled by the VCM over a predetermined time interval.

22. The method as recited in claim 14, wherein the estimated seek time for each command in the command queue is decreased if the estimated motor capability increases.

23. The method as recited in claim 14, wherein the estimated seek time for each command in the command queue is increased if the estimated motor capability decreases.

24. The method as recited in claim 14, further comprising the step of modifying the estimated seek time for each command in the command queue in response to the estimated motor capability and a seek distance for each command in the command queue.

25. The method as recited in claim 24, wherein the step of modifying the estimated seek time for each command in the command queue comprises the steps of:

(a) computing a seek time delta in response to the estimated motor capability and the seek distance; and (b) adding the seek time delta to a nominal estimated seek time.

26. The method as recited in claim 25, wherein the estimated seek time for each command in the command queue is modified according to:

$$est\_st = est\_st_0 + k * D(st(L))/D(a) * da$$

where:

st(L) is a seek time as a function of the seek distance L;

$est\_st_0$ is the nominal estimated seek time;

a is the estimated motor capability;

$a_0$ is a nominal motor capability;

da is the difference between a and $a_0$; and k is a discounting scalar.

* * * * *